United States Patent
Liang et al.

(10) Patent No.: US 10,240,019 B2
(45) Date of Patent: Mar. 26, 2019

(54) INJECTION-FOAMABLE STYRENIC MONOMER-DIOLEFIN COPOLYMER, A METHOD FOR THE PREPARATION THEREOF AND USE THEREOF

(71) Applicants: Hongwen Liang, Hunan (CN); Aimin Zhang, Sichuan (CN); Lixin Zhou, Hunan (CN); Jinkui Xia, Hunan (CN); Zhibin Zhang, Hunan (CN); Weiping Zhou, Hunan (CN)

(72) Inventors: Hongwen Liang, Hunan (CN); Aimin Zhang, Sichuan (CN); Lixin Zhou, Hunan (CN); Jinkui Xia, Hunan (CN); Zhibin Zhang, Hunan (CN); Weiping Zhou, Hunan (CN)

(73) Assignee: CHINA PETROCHEMICAL CORPORATION, Beijing (CN)

( * ) Notice: Subject to any disclaimer, the term of this patent is extended or adjusted under 35 U.S.C. 154(b) by 91 days.

(21) Appl. No.: 14/157,479

(22) Filed: Jan. 16, 2014

(65) Prior Publication Data

US 2015/0051309 A1 Feb. 19, 2015

Related U.S. Application Data

(63) Continuation of application No. 13/054,302, filed as application No. PCT/CN2009/000797 on Jul. 15, 2009, now abandoned.

(30) Foreign Application Priority Data

Jul. 15, 2008 (CN) .......................... 2008 1 0132355

(51) Int. Cl.
| | |
|---|---|
| *C08J 9/00* | (2006.01) |
| *C08J 9/14* | (2006.01) |
| *B29C 44/02* | (2006.01) |
| *B29K 23/00* | (2006.01) |
| *C08F 297/04* | (2006.01) |
| *C08F 236/10* | (2006.01) |
| *C08F 212/08* | (2006.01) |
| *B29L 31/00* | (2006.01) |
| *C08J 9/228* | (2006.01) |
| *C08L 53/02* | (2006.01) |

(52) U.S. Cl.
CPC ............. *C08J 9/228* (2013.01); *B29C 44/022* (2013.01); *C08F 236/10* (2013.01); *C08F 297/04* (2013.01); *C08J 9/0061* (2013.01); *C08J 9/141* (2013.01); *C08L 53/02* (2013.01); *B29K 2023/083* (2013.01); *B29L 2031/772* (2013.01); *C08F 212/08* (2013.01); *C08J 2325/10* (2013.01); *C08J 2331/04* (2013.01); *C08J 2347/00* (2013.01); *C08J 2353/02* (2013.01); *C08J 2423/00* (2013.01)

(58) Field of Classification Search
CPC .... C08J 9/228; C08J 2325/10; C08J 2353/02; C08F 236/10; C08F 297/04
See application file for complete search history.

(56) References Cited

U.S. PATENT DOCUMENTS

| | | | | |
|---|---|---|---|---|
| 3,065,218 A | * | 11/1962 | Greene | .................. 526/173 |
| 3,944,528 A | | 3/1976 | Loveless | |
| 4,248,984 A | * | 2/1981 | Bi | .................. C08G 81/022 525/314 |
| 4,367,325 A | | 1/1983 | Takeuchi et al. | |
| 4,603,155 A | | 7/1986 | Muramori et al. | |
| 4,918,133 A | | 4/1990 | Moriya et al. | |
| 5,241,008 A | * | 8/1993 | Hall | .................. C08F 236/10 525/250 |
| 5,290,875 A | * | 3/1994 | Moczygemba et al. | ....... 525/314 |
| 6,031,053 A | * | 2/2000 | Knoll et al. | .................. 525/314 |
| 6,197,889 B1 | | 3/2001 | Knoll et al. | |
| 6,372,853 B1 | | 4/2002 | Li et al. | |
| 6,489,425 B1 | | 12/2002 | Yoon et al. | |
| 7,655,720 B2 | | 2/2010 | He et al. | |
| 2006/0094830 A1 | * | 5/2006 | Devonport | ............ C08F 220/06 525/330.3 |
| 2006/0154998 A1 | * | 7/2006 | Shiba et al. | .................. 521/142 |
| 2007/0161763 A1 | | 7/2007 | Desbois | |
| 2007/0219316 A1 | | 9/2007 | Viola | |
| 2009/0076230 A1 | * | 3/2009 | Sheehan | .................. C08F 2/00 526/60 |

(Continued)

FOREIGN PATENT DOCUMENTS

| | | |
|---|---|---|
| CN | 1242381 | 1/2000 |
| CN | 1377905 | 11/2002 |
| CN | 1410465 | 4/2003 |

(Continued)

OTHER PUBLICATIONS

Derwent Abstract for JP 60-228520 A/JP 94021136 B2 (Acc-No. 1986-003074, Nov. 1985).*
Machine translated English equivalent of JP 06-021136B (which is the same as JP 60-228520A and JP 94-021136B, Nov. 1985, 8 pages).*

(Continued)

*Primary Examiner* — Brieann R Johnston
(74) *Attorney, Agent, or Firm* — Finnegan, Henderson, Farabow, Garrett & Dunner LLP

(57) ABSTRACT

A styrenic monomer-diolefin copolymer comprises polystyrenic monomer micro-blocks and polydiolefin micro-blocks, in which the content of styrenic monomer units is 10-80 wt %, the ratio of diolefin units of 1,2-structure is less than 30% in the total diolefin units, and the number-average molecular weight (Mn) of the copolymer is 25,000-500,000. The preparation methods and uses in foam products thereof are also disclosed.

15 Claims, 6 Drawing Sheets

(56) References Cited

U.S. PATENT DOCUMENTS

2014/0350182 A1* 11/2014 Chiefari ............... B01J 19/242
525/52

FOREIGN PATENT DOCUMENTS

| CN | 1439026 | 8/2003 |
| CN | 1524888 | 9/2004 |
| CN | 1654579 | 8/2005 |
| CN | 101113188 | 1/2008 |
| EP | 254766 | 2/1988 |
| EP | 2 743 281 | 4/2011 |
| JP | 60228520 A * | 11/1985 |
| TW | 200716685 | 5/2007 |
| WO | WO 02/02663 | 1/2002 |

OTHER PUBLICATIONS

Arkema (Di-Cup Dicumyl Peroxide. Arkema. Apr. 2009, 4 pages).*
Human translation of JP 06-021136 B (Mar. 1994, 23 pages).*
International Search Report from the Chinese Patent Office for International Patent Application No. PCT/CN2009/000797, dated Oct. 29, 2009.
Tao Zhou et al., *Molecular Chain Movements and Transitions of SEBS above Room Temperature Studied by Moving-Window Two-Dimensional Correlation Infrared Spectroscopy*, Macromolecules, v. 40, pp. 9009-9017 (2007).
Mogilevich, "Influence of the Degree of Microblock Structures on Properties of Butadiene-Styrene Copolymers", Polymer Science U.S.S.R., 28, 7, pp. 1645-1652 (1986).
Mogilevich, "Effect of Microblock Number on the Properties of Piperylene-Styrene Copolymers", Polymer Science U.S.S.R., 30, 9, pp. 2131-2137 (1988).

* cited by examiner

INJECTION-FOAMABLE STYRENIC MONOMER-DIOLEFIN COPOLYMER, A METHOD FOR THE PREPARATION THEREOF AND USE THEREOF

CROSS REFERENCE OF RELATED APPLICATIONS

The present application is a continuation of U.S. application Ser. No. 13/054,302, filed on Apr. 14, 2011, now abandoned, which is the National Stage under 35 USC § 371 of International Application Number PCT/CN2009/000797, filed Jul. 15, 2009, which claims the benefits of Application No. CN200810132355.0 as filed on Jul. 15, 2008, which is incorporated herein by reference in its entirety and for all purposes.

TECHNICAL FIELD

The invention relates to an injection-foamable styrenic monomer-diolefin copolymer, a method for the preparation thereof, and use thereof. More specifically, the invention relates to a styrenic monomer-diolefin copolymer comprising micro-blocks of polystyrenic monomer and micro-blocks of polydiolefin monomer, a method for the preparation thereof, and use thereof.

BACKGROUND ART

It is well known that styrene/butadiene block copolymers (SBS–s) are the earliest commericially produced styrenic monomer-based thermoplastic elastomers. SBS's can be used, for example, in the preparation of soles, adhesives and elastomeric commodities, and for modifying bitumen and plastics. The largest application field of SBS's is the production of soles, and SBS's used for soles comprise more than 50% of the world SBS's consumption.

Conventional SBS's are phase-separated block copolymers, and shearing viscosities of their melts are quite insensitive to temperature and shearing rate. In the processing of SBS's, the physical entanglement of styrene will result in the inhomogenity of viscosity of their melts (PB segments have a lower viscosity, and the interfaces of the PB and PS phases have a higher viscosity), so that AC as a flowing agent is dispersed unevenly, leading to uneven cellules. Hence, articles obtained by foaming SBS's do not meet the requirements to soles in tearing strength, stretching strength, wearing resistance, etc. In order to improve the properties of a SBS foamed article, such as stretching strength, tearing strength, chemical solvent resitance, wearing resistance and the like, an approach is to add a crosslinking agent during the foaming, but this approach suffers from two difficulties that are difficult to be overcome: one relates to the addition of the crosslinking agent—typical crosslinking agents are decomposed at a temperature below 140° C., while the plasticizing temperature of SBS's is above 170° C.; the other is that the polybutadiene phase of the conventional SBS's has a high double-bond density so that a "scorching" (a very quick chain exothermal reaction) phenomenon may appear under the action of the crosslinking agent, and the production can hardly proceed or has safety troubles or give less eligible products. Since chemically crosslinking foaming, let alone injection foaming, of SBS's cannot be achieved, the soles prepared from SBS's have high densities and inferior wearing resistance, and are therefore replaced gradually with other materials such as EVA, polyurethane (PU), etc.

Random styrenic monomer-diolefin copolymer and preparation thereof are also disclosed in numerous scientific literatures and patents. Chinese Patent Application CN 101113188A discloses a continuous method for preparing a conjugated diene/vinylarene random copolymer. The vinylarene may be styrene, the conjugated diene may be 1,3-butadiene, and the copolymer has a molecular weight ranging from 200,000 to 800,000, and a polydispersity index $M_w/M_n=1.6$ to 2.5. This copolymer is designed for automobile tire tread. The large molecular weight of this copolymer renders its melt viscosity too large to be foamed, let alone injection processed.

U.S. Pat. No. 4,367,325 disloses a styrene/butadiene random copolymer and a process for the production thereof. This styrene/butadiene random copolymer has a styrene monomer content of 3 to 30%, and a content of 1,2-structure in the butadiene monomer units ranging from 70 to 90%. This copolymer can be used to produce automobile tire, and has a low rolling resistance and a high wet skid resistance. This copolymer has a high melt viscosity and thus cannot be injection processed.

Furthermore, conventional styrene/butadiene random copolymers cannot be reprocessed after having been chemically crosslinked.

The currently used EVA foamed articles exhibit predominantly plastic character in stretching strength, tearing strength, compression set, wearing resistance, skid resistance, etc., and thus cannot fully meet the requirements applied by shoe production. When used as sole raw materials, polyurethanes also have drawbacks, such as a high production cost, a large toxicity of the monomers for the polyurethanes, a complexity of the foaming process, an inferior wet skid resistance, easiness of cracking, fracture of shoe heel, etc., and cannot also be injection foamed.

Thus, it is desired to provide a novel injection-foamable styrenic monomer-diolefin copolymer useful, for example, in the application of soles.

SUMMARY OF THE INVENTION

Through molecular structure design and extensive studies, the inventors have found that styrenic monomer-diolefin copolymers having a suitable molecular weight and a suitable content of styrenic monomer(s) and comprising micro-blocks of polystyrenic monomer and micro-blocks of polydiolefin monomer have a good injection-foamable property. The reason is that these copolymers have a low melt viscosity in thermally processing so that they can be conveniently injection processed and that a chemical flowing agent can easily generate tiny and uniform cellules. During the chamically expanding, the uniformally distributed polydiolefin micro-blocks provide a suitable number of chemically crosslinking sites. The copolymer molecular network formed through these crosslinking sites by means of a crosslinking agent and physical crosslinkage formed through the polystyrenic monomer micro-blocks function together to stablize the tiny cellules generated by the chemical flowing agent. The inventors have further found that, since the polydiolefin micro-blocks are uniformly distributed among the polystyrenic monomer micro-blocks, the styrenic monomer-diolefin copolymers of the invention avoid essentially the rapid, exothermal chain crosslinking reaction resulted from the aggregation of polybutadiene, and thus during the crosslinking, no "scorching" phenomenon suffered by SBS's occurs. This copolymer structure design ensures that the foamed materials produced from these copolymers have a sufficient elasticity similar to that of a rubber material, and the physical crosslinkage formed through the polystyrenic monomer micro-blocks results in that these materials remain reprocessibility possessed by conventional SBS's. Thus, the styrenic monomer-diolefin copolymers of the invention are enviroment-friendly. The styrenic monomer-diolefin copolymers of the invention can be used to produce soles, and the copolymers can be proceesed at a low cost through the existing injection foaming equipment. On this basis, the invention is made.

An object of the present invention is to provide a styrenic monomer-diolefin copolymer comprising micro-blocks of polystyrenic monomer and micro-blocks of polydiolefin monomer.

Another object of the present invention is to provide a method for the preparation of the styrenic monomer-diolefin copolymer comprising micro-blocks of polystyrenic monomer and micro-blocks of polydiolefin monomer according to the invention.

Still another object of the present invention is to provide use of the styrenic monomer-diolefin copolymer comprising micro-blocks of polystyrenic monomer and micro-blocks of polydiolefin monomer according to the invention.

Still another object of the present invention is to provide a foamed article produced from the styrenic monomer-diolefin copolymer according to the inventiona.

DESCRIPTION OF PREFERRED EMBODIMENTS

Figure 1:
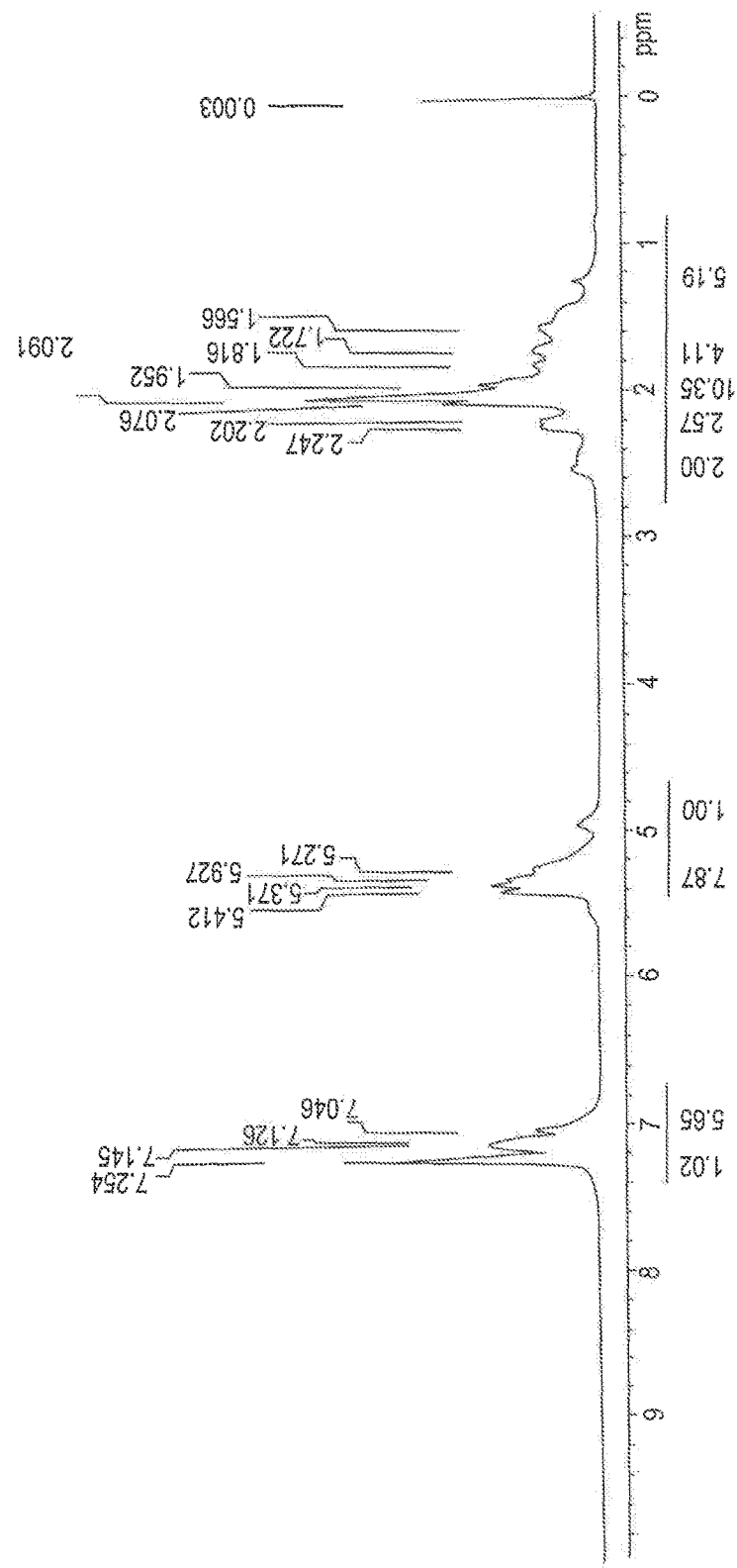
FIG. 1 shows a $^1$H NMR spectrum of the styrene-butadiene copolymer of Example 1.

In a first aspect, the invention provides a styrenic monomer-diolefin copolymer comprising micro-blocks of polystyrenic monomer and micro-blocks of polydiolefin monomer.

As used herein, the term "micro-block of polystyrenic monomer" is intended to mean a segment of polystyrenic monomer having a polymerization degree of from 2 to 100, and preferably from 3 to 70. As used herein, the term "micro-block of polydiolefin monomer" is intended to mean a segment of polydiolefin having a polymerization degree of from 2 to 400, and preferably from 3 to 330.

In an embodiment, the styrenic monomer-diolefin copolymer comprising micro-blocks of polystyrenic monomer and micro-blocks of polydiolefin monomer according to the invention has a content of styrenic monomer units ranging from 10 to 80 wt %, a ratio of 1,2-polymerized diolefin units to total diolefin units of less than 30%, and a number average molecular weight (Mn) ranging from 25,000 to 500,000.

In an embodiment, the styrenic monomer-diolefin copolymer comprising micro-blocks of polystyrenic monomer and micro-blocks of polydiolefin monomer according to the invention has a linear structure, and may be represented by the formula (I):

$$PS_{X1}(PS_{X2}PB_Y)_nPS_{X3} \qquad (I)$$

wherein,
PS represents a polymeric segment of styrenic monomer,
PB represents a polymeric segment of diolefin monomer,
X1, X2, X3 and Y each represents the polymerization degree of the respective polymeric segment, and
X1 is an integer ranging from 0 to 150,
X2, in each appearance, is independently an integer ranging from 1 to 150, preferably from 1 to 100, and more preferably from 1 to 70,
Y, in each appearance, is independently an integer ranging from 1 to 500, preferably from 1 to 400, and more preferably from 1 to 330,
X3 is an integer ranging from 0 to 150, and
n is an integer ranging from 5 to 3000, and preferably from 10 to 3000, provided that at least 30 mol %, preferably at least 50 mol %, more preferably at least 70 mol %, still more preferably at least 90 mol %, still more preferably at least 95 mol %, still more preferably at least 98 mol %, still more preferably at least 99 mol % of the styrenic monomer-derived units are within the polystyrenic monomer segments having a polymerization degree of from 2 to 100, and preferably from 3 to 70, and at least 30 mol %, preferably at least 50 mol %, more preferably at least 70 mol %, still more preferably at least 90 mol %, still more preferably at least 95 mol %, still more preferably at least 98 mol %, and still more preferably at least 99 mol % of the diolefin monomer-derived units are within the polydiolefin segments having a polymerization degree of from 2 to 400, and preferably from 3 to 330.

In another embodiment, the styrenic monomer-diolefin copolymer comprising micro-blocks of polystyrenic monomer and micro-blocks of polydiolefin monomer according to the invention has a multi-arm star-like structure, and may be represented by the formula (II):

$$(PS_{X1}(PS_{X2}PB_Y)_n)_mR \qquad (II)$$

wherein,
PS, PB, X1, X2, X3, Y and n are as defined for the formula (I) above,
R is a star-shaped coupling agent "nucleus",
m is an integer of from 3 to 10,
provided that at least 30 mol %, preferably at least 50 mol %, more preferably at least 70 mol %, still more preferably at least 90 mol %, still more preferably at least 95 mol %, still more preferably at least 98 mol %, still more preferably at least 99 mol % of the styrenic monomer-derived units are within polystyrenic monomer segments having a polymerization degree of from 2 to 100, and preferably from 3 to 70, and at least 30 mol %, preferably at least 50 mol %, more preferably at least 70 mol %, still more preferably at least 90 mol %, still more preferably at least 95 mol %, still more preferably at least 98 mol %, and still more preferably at least 99 mol % of the diolefin monomer-derived units are within polydiolefin segments having a polymerization degree of from 2 to 400, and preferably from 3 to 330.

In another embodiment, the styrenic monomer-diolefin copolymer comprising micro-blocks of polystyrenic monomer and micro-blocks of polydiolefin monomer according to the invention is a combination of linear molecules and star-shaped molecules having from 3 to 10 arms.

In a preferred embodiment, a plurality of $PS_{X2}PB_Y$ segments constitute a styrenic monomer-diolefin tapered block, of which composition varies gradually, and the $(PS_{X2}PB_Y)_n$ segment consists of a plurality of such tapered blocks.

The styrenic monomer-diolefin copolymer of the invention has a content of styrenic monomer-derived units ranging from 10 to 80 wt %, or from 20 to 80 wt %, or from 30 to 75 wt %, or from 30 to 60 wt %, or from 35 to 60 wt %, or from 35 to 50 wt %, or from 40 to 48 wt %, or from 50 to 70 wt %. Examples of the styrenic monomer include, but are not limited to, styrene, methyl styrene, ethyl styrene, butyl styrene, tert-butyl styrene, dimethyl styrene, chlorostyrene, bromostyrene, methoxy styrene, acetoxystyrene, α-methyl styrene and combinations thereof, preferably styrene, p-methyl styrene and p-tert-butyl styrene.

The copolymer of the invention further comprises diolefin monomer-derived units. Examples of the diolefin monomer include, but are not limited to, 1,3-butadiene, 2-methyl-1,3-butadiene, 1,3-hexadiene, 2,3-dimethyl-1,3-butadiene and combinations thereof, and preferably 1,3-butadiene and 2-methyl-1,3-butadiene. In the copolymer of the invention, a ratio of 1,2-polymerized diolefin units to the total diolefin units may be less that 30 mol %, preferably less than 25 mol %, more preferably less than 20 mol %, still preferably from 5 to 20 mol %, and more preferably from 10 to 20 mol %.

The styrenic monomer-diolefin copolymer of the invention has a number average molecular weight ($M_n$) ranging from 25,000 to 500,000, preferably from 25,000 to 300,000, more preferably from 25,000 to 250,000, and more preferably from 30,000 to 180,000. The styrenic monomer-diolefin copolymer of the invention may have a molecular weight distribution, $M_w/M_n$, ranging from 1.01 to 1.40, preferably from 1.01 to 1.30, preferably from 1.01 to 1.20, more preferably from 1.01 to 1.15, and still more preferably from 1.01 to 1.10.

In the copolymer of the invention, the polymerized styrenic monomers and the polymerized diolefin monomers are present mainly in the polymer molecule chains as micro-blocks, so that the phase separation extent between the polystyrenic monomer phase regions and the polydiolefin phase regions is very low and, at the same time, a single polystyrenic monomer phase region has a low molecular weight. Thus, the polymer has a low shearing viscosity and a low plasticizing temperature, and can be blended with a processing aid and injection molded at a temperature below the decomposition temperature of a crosslinking agent such as DCP (140° C.). Furthermore, since the polydiolefin phase regions are highly dispersed, the "scorching" phenomenon is uneasy to occur during crosslinking.

It is preferred that there is not full phase separation between the polystyrenic monomer phase and the polydiolefin phase in the polymer of the invention.

In a preferred embodiment, the copolymer of the invention consists essentially of micro-blocks of polystyrenic monomer and micro-blocks of polydiolefin monomer. By the expression "consists essentially of micro-blocks of polystyrenic monomer and micro-blocks of polydiolefin monomer" it is meant that the micro-blocks of polystyrenic monomer and the micro-blocks of polydiolefin monomer together comprise at least 90 wt %, preferably at least 95 wt %, more preferably at least 98 wt %, and more preferably at least 99 wt % of the total copolymer.

The styrenic monomer-diolefin copolymer comprising micro-blocks of polystyrenic monomer and micro-blocks of polydiolefin monomer according to the invention has a moving-window two-dimensional infrared correlation spectrum different from those of the known styrenic monomer-diolefin block copolymers and styrenic monomer-diolefin random copolymers. As can be seen from the Figures, the copolymers of the invention have moving-window two-dimensional correlation infrared spectra having two or three continuous thermal transition peaks in a temperature range of from about 70 to 150° C. in a wave number range of from about 2842 to 2848 $cm^{-1}$, whereas both the styrenic monomer-diolefin block copolymer and the styrenic monomer-diolefin copolymer have a single or multiple discrete thermal transition peaks in the above ranges.

In a second aspect, the invention provides a method for preparing a linear styrenic monomer-diolefin copolymer comprising micro-blocks of polystyrenic monomer and micro-blocks of polydiolefin monomer, comprising:

1) adding an amount of a solvent and an activator to a polymerization reactor and heating the contents to a temperature ranging from 50 to 110° C.;

2) adding 0 to 45 wt % of a styrenic monomer to the reactor;

3) adding a desired amount of an initiator to the reactor and allowing the reaction to continue for 0 to 30 minutes;

4) after sufficiently mixing 10 to 100 wt % of the styrenic monomer with all of a diolefin monomer, adding the resulting mixture to the reactor over a period of time ranging from 5 to 180 minutes, either continuously, batch-wise, or pulsedly, with a reaction temperature inside the reactor being controlled during the addition so that the maximum reaction temperature differs from the initiating temperature by no more than 50° C., preferably by no more than 30° C., and more preferably by no more than 20° C.;

5) adding the remaining 0 to 45 wt % of the styrenic monomer to the reactor and allowing the reaction to continue for further 2 to 30 minutes; and 6) at the end of the reaction, terminating the reaction and recovering the produced copolymer.

The solvent useful in the present method may be any of those commonly used in the production of solution polybutandiene-styrene rubbers. Examples include, but are not limited to, cyclohexane, n-hexane, benzene, toluene, xylenes and hexanes, and combinations thereof. In the present method, the amount of the solvent used may be such that the concentration of the monomers ranges from 5 to 30 wt %, based on the total weight of the reaction mixture.

The initiator useful in the present method includes a varity of alkyllithiums commonly used in anionic polymerization, such as n-butyllithium and sec-butyllithium. The amount of the initiator used may be selected depending on the desired molecular weight of the product, and this is within the knowledge of a person skilled in the art.

An example of the activator useful in the present method is tetrahydrofuran (THF), and it can be used in an amount ranging from 50 to 1200, preferably from 80 to 500, more preferably from 100 to 300, still more preferably from 120 to 220, and most preferably from about 150 to 200 mg THF/kg polymerization solvent.

Optionally, the present method further employs a microstructure modifier. Examples include Lewis base compounds, such as tetramethyl ethylenediamine, diethyl ether of ethylene glycol, and the like, and they can be used in an amount ranging from 1 to 50 mg/kg polymerization solvent.

In the present method, the styrenic monomer comprises from 10 to 80 wt %, or from 20 to 80 wt %, or from 30 to 75 wt %, or from 30 to 60 wt %, or from 35 to 60 wt %, or from 35 to 50 wt %, or from 40 to 48 wt %, or from 50 to 70 wt %, of the total monomers, with the balance being diolefin monomer.

In step 3) of the present method, the monomer mixture may be added to the polymerization reactor over a period of time ranging from 5 to 180 minutes, preferably from 10 to 120 minutes, more preferably from 15 to 90 minutes, and most preferably from 20 to 60 minutes. Upon the completion of the monomer addition in step 3) and in optional step 4), the reaction is optionally allowed to continue for further 5 to 120 minutes, and preferably 10 to 60 minutes.

During the polymerization, the reaction temperature is controlled in a range of from 50 to 110° C., preferably from 60 to 100° C., and more preferably from 70 to 90° C.

At the end of the polymerization, a termination agent is added to terminate the reaction. The termination agent useful in the invention may be any of those commonly used in the art, such as water, alcohols and other compounds containing an active hydrogen.

Finally, the resultant copolymer can be recovered through techniques well known by those skilled in the art. For example, it is possible to add an amount of a conventional antioxidant to the reaction mixture, and then to subject the product to coagulation and drying, to give a finished copolymer.

The star-shaped copolymer of the invention may be prepared by a method comprising the steps of:

1) adding an amount of a solvent and an activator to a polymerization reactor and heating the contents to a temperature ranging from 50 to 110° C.;

2) adding 0 to 45 wt % of a styrenic monomer to the reactor;

3) adding a desired amount of an initiator to the reactor and allowing the reaction to continue for 0 to 30 minutes;

4) after sufficiently mixing 55 to 100 wt % of the styrenic monomer and 90 to 100 wt % of a diolefin monomer, adding the resulting mixture to the reactor over a period of time ranging from 5 to 180 minutes, either continuously, batch-wise, or pulsedly, with a reaction temperature inside the reactor being controlled during the addition so that the maximum reaction temperature differs from the initiating temperature by no more than 50° C., preferably by no more than 30° C., and more preferably by no more than 20° C.;

5) optionally, adding the remaining 0 to 10 wt % of the diolefin monomer to the reactor and allowing the reaction to continue for 5 to 30 minutes;

6) adding a desired amount of a coupling agent to the reaction mixture and allowing the reaction to continue for 5 to 60 minutes;

7) at the end of the reaction, terminating the reaction and recovering the produced copolymer.

Except for step 6) for the coupling raction, the above method employs the same materials and process conditions as described above for the method for preparing the linear copolymer according to the invention.

In order to prepare the star-shaped copolymer according to the invention, systhesis conditions should be controlled so that the living chain ends used for a coupling reaction are polydiolefin segments or polystyrenic monomer-diolefin copolymer segment with a high diolefin unit content, to enhance coupling degree and coupling efficiency.

Various coupling agents and process conditions well known by those skilled in the art can be used in coupling step 6). For example, the coupling agent may be silicon tetrachloride, divinylbenzene, dichlorodimethylsilicane, tetraethoxysilicane, or diphenyldimethoxysilicane, the equivalent ratio of the coupling agent to the living chain end may vary widely, and the coupling reaction may be conducted at a temperature ranging from 50 to 110° C. for, for example, 5 to 60 minutes.

With the above-described method, by selecting the amount of the coupling agent, it is possible to obtain a product consisting essentially of a star-shaped copolymer (in this case, the equivalent ratio of the coupling agent to the living chain end is about 1:1 or more) and to obtain a product consisting of a star-shaped copolymer and a linear copolymer (in this case, the equivalent ratio of the coupling agent to the living chain end is less than 1:1, for example less than 0.95:1).

In an embodiment, it is possible to prepare separately a linear copolymer and an essentially star-shaped copolymer at first, and then mix the both in a proportion according to demand, to obtain a composition of the linear copolymer and the essentially star-shaped copolymer.

Without being bound by a specific theory, the mechanism described below may help to understand how the styrenic monomer-diolefin copolymer comprising micro-blocks of polystyrenic monomer and micro-blocks of polydiolefin monomer according to the invention forms.

Taking the preparation of a styrene-butadiene copolymer as an example, it is believed that there are the following six different reactions during the polymerization:

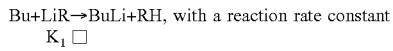

Bu+LiR→BuLi+RH, with a reaction rate constant $K_1$

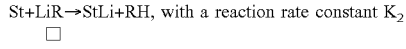

St+LiR→StLi+RH, with a reaction rate constant $K_2$

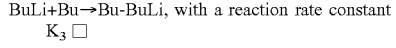

BuLi+Bu→Bu-BuLi, with a reaction rate constant $K_3$

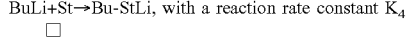

BuLi+St→Bu-StLi, with a reaction rate constant $K_4$

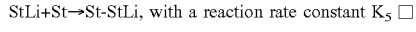

StLi+St→St-StLi, with a reaction rate constant $K_5$

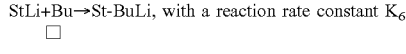

StLi+Bu→St-BuLi, with a reaction rate constant $K_6$ wherein, Bu represents butadiene monomer or its polymerized form, St represents styrene monomer or its polymerized form, and LiR represents an alkyllithium as an initiator.

The reaction rate constants of these reactions have the following relationship:

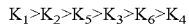

$K_1 > K_2 > K_5 > K_3 > K_6 > K_4$

When the monomers are added in a pulse manner, at the initial stage of the polymerization reaction, the styrene monomer and butadiene monomer in the monomer mixture will react with an alkyllithium initiator such as butyllithium to form living initiating species, BuLi and StLi. Since the butadiene has a low boiling point, at the moment of feeding, most butadiene molecules are vaporized so that the species participating in the initiating reaction are predominately styrene, and thus the initial reaction forms mainly StLi. StLi will react preferentially with styrene in the mixed monomers, and thus what are predominately formed are polystyrene blocks. When the concentration of the styrene monomer in the polymerization system decreases to a sufficiently low level, butadiene monomer will participate in the reaction to form styrene-butadiene alternating copolymer blocks and, as the concentration of the styrene monomer further decreases, polybutadiene blocks will be predominately formed. After a further pulse addition of the feedstocks, the above process is repeated. Thus, a styrenic monomer-diolefin copolymer comprising micro-blocks of polystyrenic monomer and micro-blocks of polydiolefin monomer is formed.

In the methods of the present invention, if a pulse addition or a batch-wise addition of the feedstocks is employed, the addition duration of the monomer mixture should be controlled so that the rate at which the monomers are consumped in the polymerization is comparble to or larger than the rate at which the monomers are added; if a continuous addition of the feedstocks is employed, the addition duration of the monomer mixture should be controlled so that the rate at which the monomers are consumed in the polymerization is comparable to or slightly larger than the rate at which the monomers are added. In this way, a polymer $(PS_{X2}PB_Y)_n$, which comprises a lot of polystyrene micro-blocks and polybutadiene micro-blocks, can be formed. A plurality of $PS_{X2}PB_Y$ segments will constitute a styrenic monomer-diolefin tapered block, of which composition varies gradually, and the $(PS_{X2}PB_Y)_n$ segment consists of a plurality of such tapered blocks.

In a third aspect, the invention provides use of the styrenic monomer-diolefin copolymer of the invention.

The styrenic monomer-diolefin copolymer of the invention may be blended with various additives at a temperature below 110° C., and then subjected to injection foaming in a mould at 170 to 195° C. The foaming process is similar to those used for EVA, and the foaming equipment may be identical to those used for EVA. In an embodiment, a foamed article may be prepared from the copolymer of the invention by a method comprising: kneading the copolymer of the invention with an additive such as stearic acid, zinc stearate, and talc powder, a crosslinking agent such as dicumyl peroxide (DCP), a flowing agent such as azodicarbonamide (flowing agent AC or AC) in an internal mixer at 80° C. for 5 to 10 minutes; pressing the resulting mixture in an open mixer into a sheet and then pelletizing it in a single screw extruder at 90° C.; feeding the resulting pellets into a single screw injector and then injecting it at 90° C. into a mould at a temperature ranging from 170 to 195° C.; maintaining at that temperature for 200 to 500 seconds; and then depressurizing and opening the mould, to remove the foamed article.

In a fourth aspect, the invention provides a foamed article prepared by foaming the copolymer of the invention.

In the foamed article of the invention, there exist both physically crosslinked points resulted from styrene entanglement and chemically crosslinked points, so that the foamed article possesses good stretching strength, tearing strength and wearing resistance, and can be reprocessed. At the same time, the foamed article of the invention possesses excellent skid resistance. The foamed article of the invention may be used for manufacturing sand bench shoes and slippers, for manufacturing midsoles of tourist shoes and sports shoes, for manufacturing outsoles of leather shoes, as vehicle interior decorative materials, or as heat insulators used in various situations.

BENEFICIAL EFFECTS OF THE INVENTION

1) The styrenic monomer-diolefin copolymers may be produced by using the current plants for producing styrenic monomer-based thermoplastic elastomers, without reconstructing the production plants.

2) In the foamed materials of the styrenic monomer-diolefin copolymers, the physical entanglement points of the styrenic polymer may replace for the chemically crosslinked points, so that the amount of a chemical crosslinking agent used can be significantly reduced. For application fields where high wearing resistance and temperature resistance are not required, it is even allowable to highly expand in the absence of a chemical crosslinking agent, thereby providing a possibility that a foamed material can be fully reused and that a low-taste or taste-free, environment-friendly foamed material can be produced.

3) The foamed materials of the styrenic monomer-diolefin copolymers remain their rubber characteristics, have a low-temperature performance better than that of EVA foamed material, and are confortable for body.

4) The foamed materials of the styrenic monomer-diolefin copolymers have excellent wet-skid resistance.

5) The foamed materials of the styrenic monomer-diolefin copolymers have a low compression set and a good resilience, and their wearing resistance, stretching strength at break and tearing strength are superior to those of EVA foamed materials. Depending on the contents of the individual monomers, the foamed materials of said polymers have hardnesses varying widely.

6) The styrenic monomer-diolefin copolymers may be injection foamed in a mould, and the pores are uniform.

7) The foamed products of the styrenic monomer-diolefin copolymers may be used for manufacturing sand bench shoes and slippers, for manufacturing midsoles of tourist shoes and sports shoes, for manufacturing outsoles of leather shoes, as vehicle interior decorative materials, or as heat insulators used in various situations.

8) The foamed products of the styrenic monomer-diolefin copolymers can be produced at a cost comparable to that of EVA, but have better properties, so that they will be more commercially interested.

EXAMPLES

The following examples are given for further illustrating the invention, but do not make limitation to the invention in any way.

Example 1

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 8.9 mmol of n-BuLi was added thereto. After stirring for 5 minutes, mixed monomers consisting of 105 g of styrene and 245 g of butadiene were continuously added to the reactor over 60 minutes, with a maximum reaction temperature being controlled below 100° C. during the addition. Upon the completion of the addition of the mixed monomers, the reaction was allowed to continue for further 20 minutes, and 5 ml of water was added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give styrene/butadiene copolymer 1. This copolymer was found to have a molecular weight of 31,000 (Mn), a molecular weight distribution of 1.02, a content of 1,2-structure in diolefin units of 17.5%, and a Shore C hardness of 65. This polymer was a random copolymer of styrene and butadiene, and its NMR spectrum is shown in FIG. 1. This product can be used for a highly damping material.

Example 2

Figure 2:
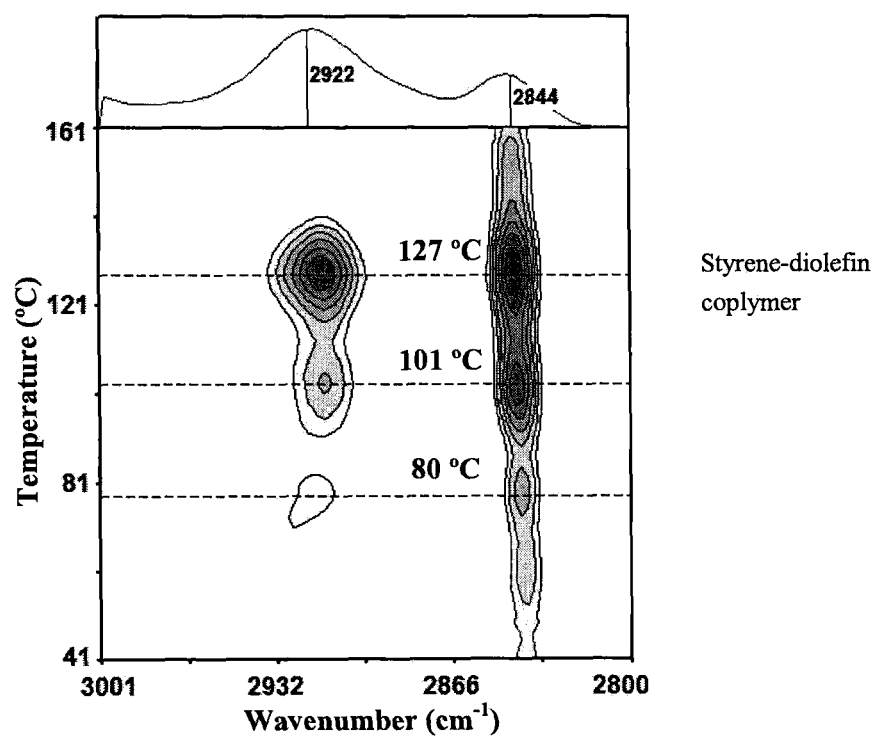
FIG. 2 shows a two-dimensional infrared correlation spectrum of the styrene-butadiene copolymer of Example 2.

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 2.71 mmol of n-BuLi was added thereto. After stirring for 5 minutes, mixed monomers consisting of 175 g of styrene and 175 g of butadiene were added in a continuous pulse manner to the reactor over 20 minutes, with a maximum reaction temperature being controlled below 100° C. during the addition. Upon the completion of the addition of the mixed monomers, the reaction was allowed to continue for further 25 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give styrene/butadiene copolymer 2. This copolymer was found to have a molecular weight of 140,000 (Mn), a molecular weight distribution of 1.01, a content of 1,2-structure in diolefin units of 15.6%, and a Shore C hardness of 80. The moving-window two-dimensional correlation infrared spectrum of this copolymer is shown in FIG. 2.

For the method for determining moving-window two-dimensional correlation Infrared spectrum, reference can be made to "Molecular Chain Movements and Transitions of SEBS above Room Temperature Studied by Moving-Window Two-Dimensional Correlation Infrared Spectroscopy", Tao Zhou, et al., Macromolecules, 2007, 40, 9009-9017.

For comparison, moving-window two-dimensional correlation infrared spectra for a triblock styrene/butadiene copolymer SBS (S:B=30:70), a fully random styrene/butadiene copolymer (S:B=30:70), a triblock styrene/2-methyl-1,3-butadiene copolymer SIS (S:I=50:50), a micro-block styrene/2-methyl-1,3-butadiene copolymer $(SI)_n$ (S:I=50:50), a triblock SIBS (S:I:B=50:25:25) and a micro-block $(SIB)_n$ (S:I:B=50:25:25) are given in FIGS. 3, 4, 5, 6, 7 and 8.

Figure 3:
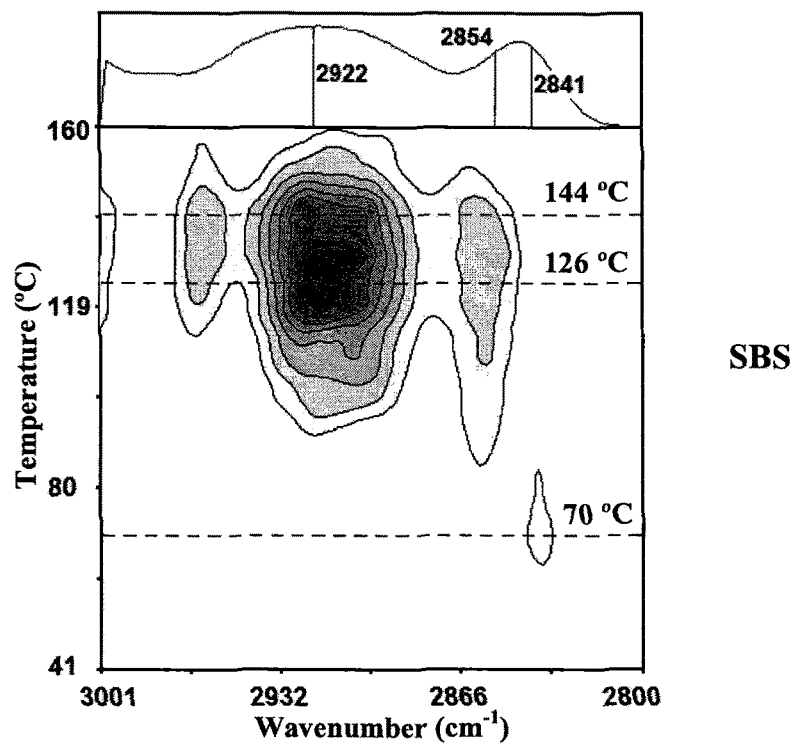
FIG. 3 shows a two-dimensional infrared correlation spectrum of a conventional triblock SBS.
Figure 4:
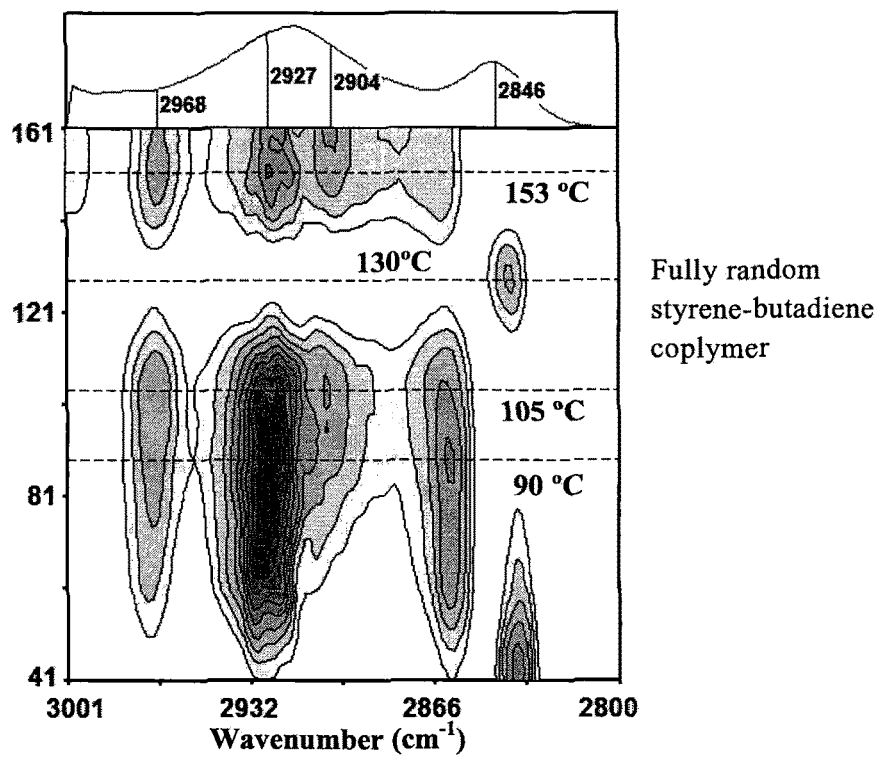
FIG. 4 shows a two-dimensional infrared correlation spectrum of a fully random styrene-butadiene copolymer.
Figure 5:
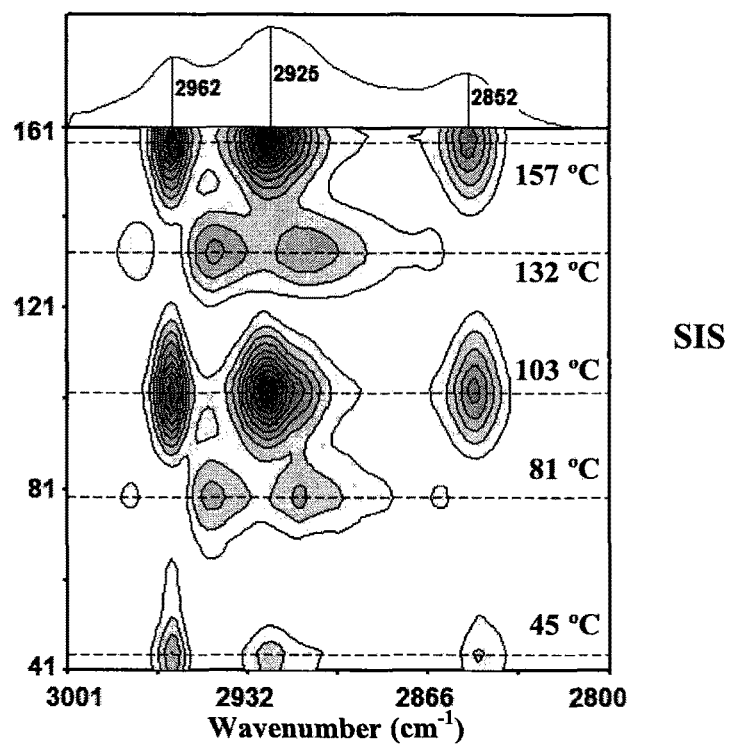
FIG. 5 shows a two-dimensional infrared correlation spectruma of a SIS.
Figure 6:
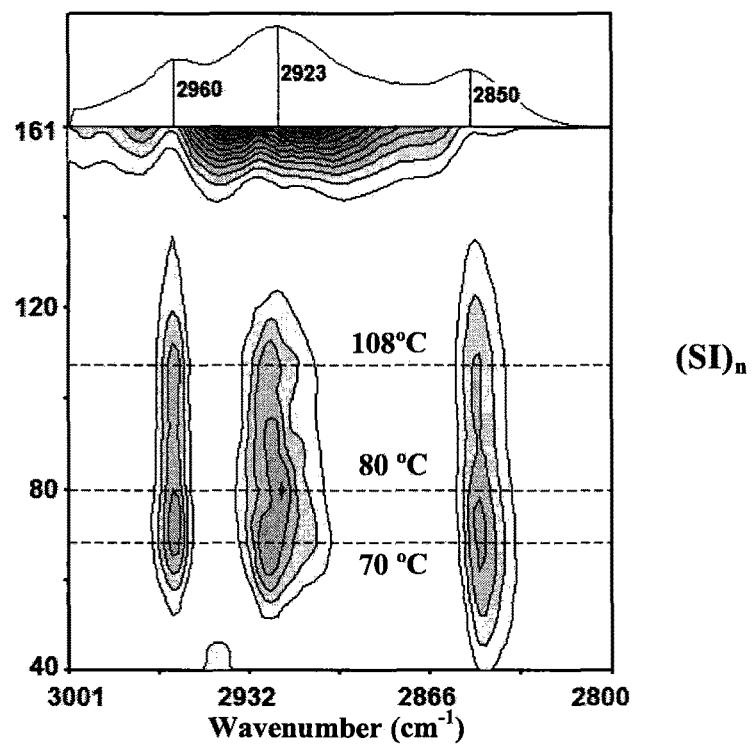
FIG. 6 shows a two-dimensional infrared correlation spectrum of a styrene-isoprene micro-block copolymer.
Figure 7:
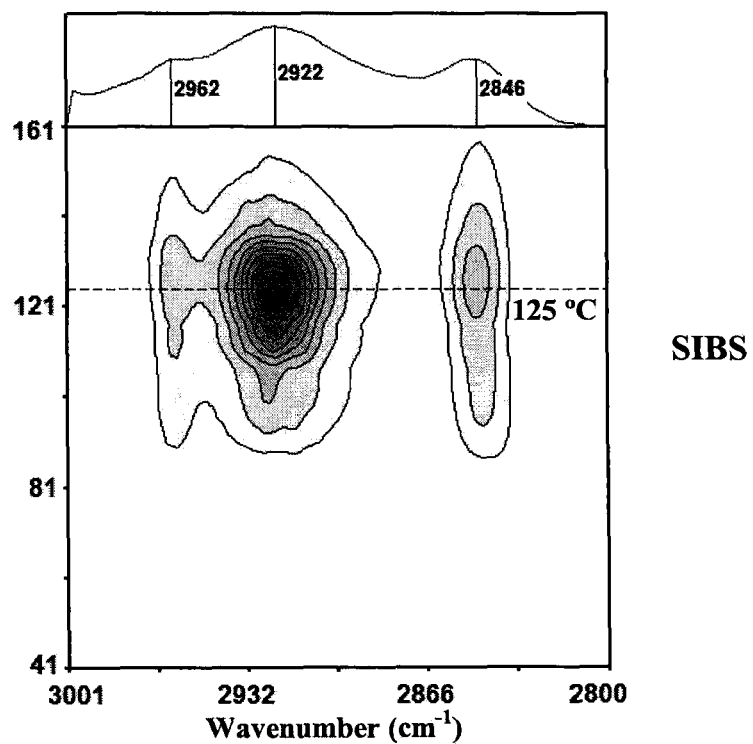
FIG. 7 shows a two-dimensional infrared correlation spectrum of a SIBS.
Figure 8:
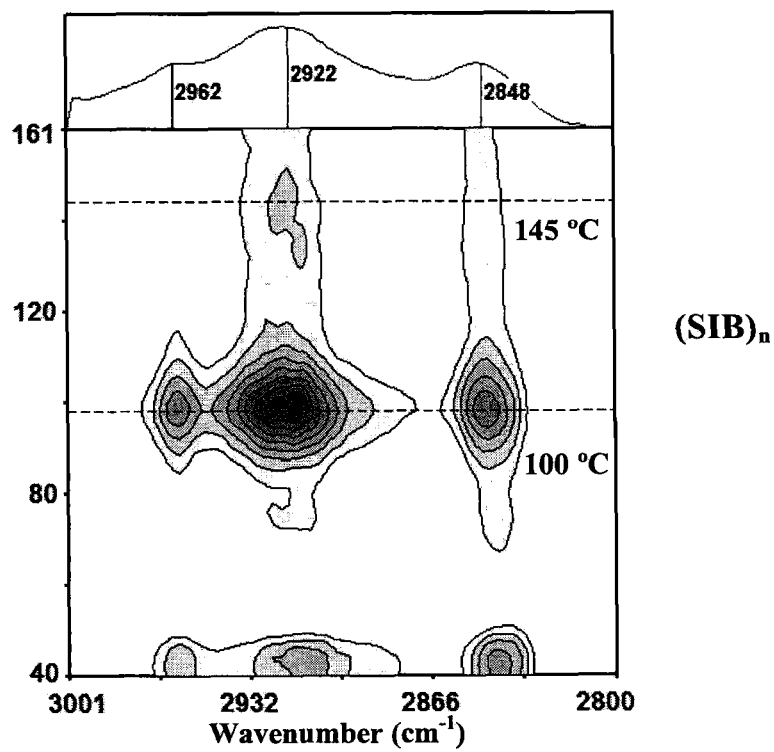
FIG. 8 shows a two-dimensional infrared correlation spectruma of a styrene-isoprene-butadiene micro-block copolymer.

It can be seen from FIG. 3 that the two-dimensional correlation infrared spectrum of the triblock SBS is relatively simple. 70° C. represents the melting of the microcrystal of polybutadiene block; 126° C. represents the glass transition of the polystyrene block; 144° C. represents the viscous flow temperature of the polystyrene block. FIGS. 4 to 8 show different thermal transitions due to the different molecular structures of the copolymers.

It can be seen from FIG. 2 that the two-dimensional correlation infrared spectrum of the inventive polymer has distinct thermal transition peaks at 80° C., 101° C. and 126° C. 80° C. is the glass transition temperature of the styrene-butadiene random copolymer segment. 101° C. is the glass transition temperature of short polystyrene blocks; and 126° C. is the viscous flow temperature of the short polystyrene blocks.

It can be known from the moving-window two-dimensional correlation infrared spectral results that the polymer obtained in this Example has a typical micro-block structure with styrene-diolefin random copolymer segments mingled in the micro-blocks.

Comparative Example 1

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 2.65 mmol of n-BuLi was added thereto. After stirring for 5 minutes, mixed monomers consisting of 175 g of styrene and 175 g of butadiene were continuously added to the reactor over 9 minutes, with a maximum reaction temperature being controlled below 100° C. during the addition. Upon the completion of the addition of the mixed monomers, the reaction was allowed to continue for further 20 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a comparative styrene/butadiene copolymer 1. In this product, the styrene segments and the butadiene segments are in fully phase-separated state. This comparative copolymer 1 was found to has a molecular weight of 146,000 (Mn), a molecular weight distribution of 1.01, a content of 1,2-structure in the total diolefin units of 13.0%, a Shore C hardness of 89, and a stretching strength at break of 17.8 MPa. This polymer had a plasticizing temperature of 135° C. When processing aids such as DCP and AC were added at a temperature above the plasticizing temperature of the polymer, 135° C., crosslinking took place in the internal mixer and bubbles were generated. However, when decreasing the processing temperature to 110° C., the polymer and the processing aids could not be mixed homogeneously, and the resulting mixture could not be used for foamed materials. When the polymer was mixed with the processing aids in an open mixer at 110° C. and then foamed at 185° C., scorching phenomenon occurred in the product.

Example 3

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 3.9 mmol of n-BuLi was added thereto. After stirring for 5 minutes, mixed monomers consisting of 157.5 g of styrene and 182.9 g of 2-methyl-1,3-butadiene were added in a continous pulse manner to the reactor over 30 minutes, with a maximum reaction temperature being controlled below 100° C. during the addition. Upon the completion of the addition of the mixed monomers, the reaction was allowed to continue for further 20 minutes, and additional 9.6 g of 2-methyl-1,3-butadiene was then added to the reactor. After polymerizing for 20 minutes, 0.875 mmol of silicon tetrachloride as a coupling agent was added. After allowing the coupling reaction to conduct for 30 minutes, 5 ml of water was added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a star-shaped styrene/2-methyl-1,3-butadiene copolymer, which was found to have a molecular weight per arm of 48,600 ($M_n$), an average number of arms of 3.70, a polymer molecular weight of 180,000 ($M_n$), a molecular weight distribution of 1.02, and a Shore C hardness of 52.

100 parts by weight of this polymer were blended with 4.1 parts by weight of AC, 0.26 parts by weight of DCP, 2.25 parts by weight of ZnO, 0.45 parts by weight of zinc stearate, 0.25 parts by weight of stearic acid, 10 parts by weight of talc powder, 1 part by weight of paraffin and 3 parts by weight of EBS in an open mixer at 110° C., and then pelletized through a single screw extruder at 110° C. The resulting pellets were injected at 110° C. into a mould at 185° C. to be foamed. The foamed product could be used to manufecture outsoles of leather shoes.

Example 4

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 6.2 mmol of n-BuLi was added thereto. After stirring for 5 minutes, mixed monomers consisting of 175 g of styrene and 166.3 g of butadiene were added in a continuous pulse manner to the reactor over 40 minutes, with a maximum reaction temperature being controlled below 100° C. during the addition. Upon the completion of the addition of the mixed monomers, the reaction was allowed to continue for further 20 minutes, and additional 8.7 g of butadiene was added to the reactor. After polymerizing for 20 minutes, 11.6 mmol of divinyl benzene as a coupling agent was added. After allowing the coupling reaction to conduct for 30 minutes, 5 ml of water was added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a star-shaped styrene/butadiene copolymer. This copolymer was found to be a 6-armed star-shaped styrene-butadiene copolymer, have a number average molecular weight of 150,000, a molecular weight distribution of 1.07, a content of 1,2-structure in the diolefin units of 13.2%, and a Shore C hardness of 55.

100 parts by weight of this polymer was blended with 4.1 parts by weight of AC, 0.26 parts by weight of DCP, 2.25 parts by weight of ZnO, 0.45 parts by weight of zinc stearate, 0.25 parts by weight of stearic acid, 10 parts by weight of talc powder, 1 part by weight of paraffin and 3 parts by weight of EBS in an open mixer at 110° C., and then pelletized through a single screw extruder at 110° C. The resulting pellets were injected at 110° C. into a mould at 185° C. to be foamed. The foamed product could be used to manufecture midsoles of tourist shoes and sports shoes.

Example 5

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 2.30 mmol of n-BuLi was added thereto. After stirring for 5 minutes, mixed monomers consisting of 157.5 g of styrene and 192.5 g of butadiene were added in a continuous pulse manner to the reactor over 45 minutes, with a maximum reaction temperature being controlled below 100° C. during the addition. Upon the completion of the addition of the mixed monomers, the reaction was allowed to continue for further 20 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a styrene/butadiene copolymer. This copolymer was a styrene/butadiene copolymer wherein styrene units were present in micro-blocks. This polymer was found to have a molecular weight of 111,000 ($M_n$), a molecular weight distribution of 1.05, a content of 1,2-structure in diolefin units of 16.0%, and a Shore C hardness of 75.

This polymer was combined with DCP, a flowing agent, talc powder, zinc stearate, zinc oxide. Then the mixture was added into an internal mixer, mixed therein below 75° C. for 10 minutes, and then pelletized through a single screw extruder below 110° C. The resulting pellets were injected below 110° C. into a mould at 180° C. to be foamed. The foamed product could be used as an external thermal-insulation material of piping.

Example 6

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 3.8 mmol of n-BuLi was added thereto. After stirring for 5 minutes, mixed monomers consisting of 175 g of styrene and 166.25 g of 2-methyl-1,3-butadiene were added in a continuous pulse manner to the reactor over 25 minutes, with a maximum reaction temperature being controlled below 100° C. during the addition. Upon the completion of the addition of the mixed monomers, the reaction was allowed to continue for further 20 minutes, and additional 8.75 g of 2-methyl-1,3-butadiene was added to the reactor. After allowing the polymerization to continue for 20 minutes, 0.825 mmol of silicon tetrachloride as a coupling agent was added thereto. The coupling reaction was conducted for 30 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a star-shaped styrene/2-methyl-1,3-butadiene copolymer. This star-shaped polymer was found to have a molecular weight per arm of 47,000 ($M_n$), an average number of arms of 3.72, a polymer molecular weight of 175,000 ($M_n$), a molecular weight distribution of 1.02, and a Shore C hardness of 65. This polymer could be injection foamed in a mould at 185° C., and the foamed product could be used as a vehicle interior decorative material.

Example 7

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 1.67 mmol of n-BuLi was added thereto. After stirring for 5 minutes, mixed monomers consisting of 140 g of tert-butyl styrene and 210 g of butadiene were added in a continuous pulse manner to the reactor over 55 minutes, with a maximum reaction temperature being controlled below 100° C. during the addition. Upon the completion of the addition of the mixed monomers, the reaction was allowed to continue for further 20 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a tert-butyl styrene/butadiene copolymer, wherein the tert-butyl styrene units were present in micro-blocks. The polymer was found to have a molecular weight of 234,000 ($M_n$), a molecular weight distribution of 1.08, a content of 1,2-structure in diolefin units of 15.5%, and a Shore C hardness of 68. This polymer could be injection foamed in a mould at 185° C., and the foamed product could be used to manufacture a highly resilient material.

Example 8

Figure 9:
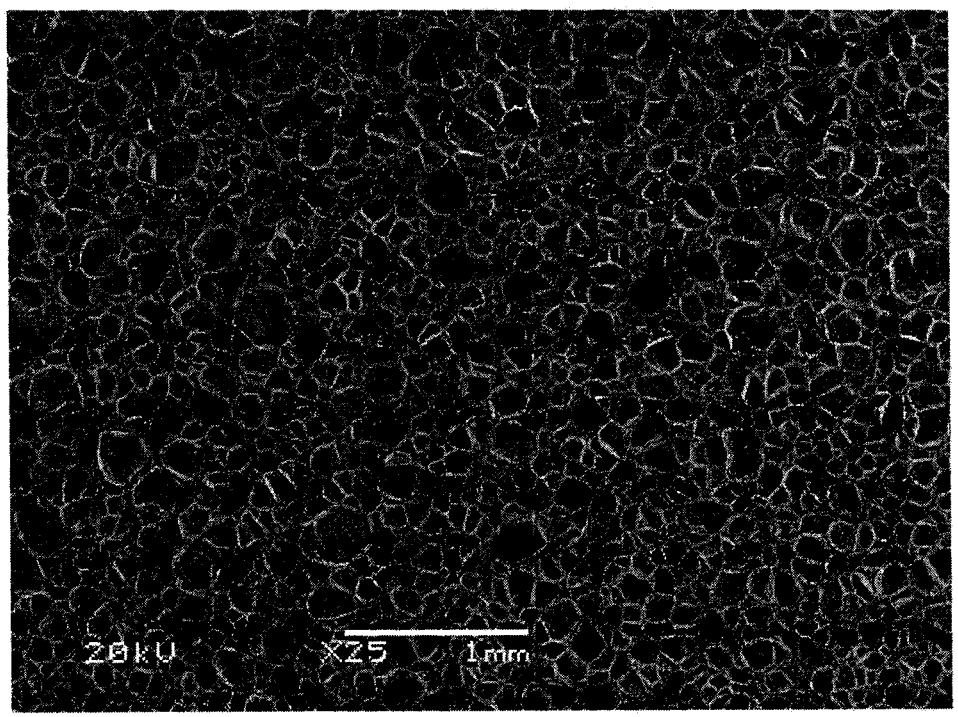
FIG. 9 shows a scanning electron microscope micrograph of the foamed material obtained in Example 8.

The styrene/butadiene copolymer 2 obtained from Example 2 was formulated according to the formulation shown in Table 1 below, and the combined materials were mixed in an internal mixer at 90° C. and then pelletized through a single screw extruder. The pellets were injected below 110° C. into a mould at 180° C. to be foamed, to give a foamed material. This foaming process is similar to that used for ordinary EVA's. The properties of the resultant foamed material are shown in Table 2 below. The scanning electron microscope micrograph of a cross-section of the foamed material is shown in FIG. 9. It can be seen that a foamed material having uniform pores can be obtained from this styrene/butadiene copolymer. The foamed product obtained in this Example could be used to manufacture sand bench shoes and slippers.

Comparative Example 2

A commercially available EVA was formulated according to the formulation shown in Table 1 below and processed by following the procedure described in Example 8, to give a foamed material. The properties of the resultant foamed material are shown in Table 2.

TABLE 1

| | Formulation of the foaming material | | | | | | | | | |
|---|---|---|---|---|---|---|---|---|---|---|
| | Styrene/butadiene copolymer 2 | EVA | AC | DCP | ZnO | Znst | St | TA | Paraffin | EBS |
| Ex. 8 | 100 | — | 4.1 | 0.26 | 2.25 | 0.45 | 0.25 | 10 | 1 | 3 |
| Comp. Ex. 2 | — | 100 | 4.1 | 0.17 | 2.25 | 0.45 | 0.25 | 10 | 1 | 3 |

Notation: St: stearic acid,
ZnO: zinc oxide,
Znst: zinc stearate,
TA: talc powder,
EBS: N,N-ethylenebisstearamide

TABLE 2

| Property | Ex. 8 | Comp. Ex. 2 | Ex. 1 | Ex. 3 | Ex. 4 | Ex. 5 | Ex. 6 | Ex. 7 |
|---|---|---|---|---|---|---|---|---|
| Density after foaming (g/cm³) | 0.16 | 0.16 | 0.16 | 0.162 | 0.15 | 0.12 | 0.25 | 0.16 |
| Shore C hardness | 50 | 50 | 25 | 40 | 48 | 55 | 65 | 35 |
| Stretching strength at break (MPa) | 2.2 | 1.5 | — | 2.1 | 1.8 | 2.3 | 3.0 | 1.7 |
| Resilience (%) | 42 | 36 | 10 | 45 | 48 | 25 | 12 | 58 |
| Compression set (%) | 18 | 32 | 100 | 16 | 18 | 22 | 10 | 16 |
| Wear loss (g) | 0.6 | 0.6 | — | 0.1 | 0.1 | — | — | — |
| 180° tearing strength (MPa) | 1.9 | 1.6 | — | 1.8 | 1.8 | 1.5 | — | — |
| Dry-skid resistance | >1.0 | 0.6 | — | 0.7 | 0.7 | — | — | — |
| Wet-skid resistance | 0.8 | 0.4 | — | 0.6 | 0.6 | — | — | — |

Hardness is measured according to GB/T10807-2006.
Resilience is measured according to GB/T6670-1997.
Compression set is measured according to GB6669-86.
Wearing resistance is measured according to GB11208-89.
Skid resistance is measured according to GB/T3903.6-2005.

Example 9

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 2.71 mmol of n-BuLi was added thereto. After stirring for 5 minutes, mixed monomers consisting of 192.5 g of styrene and 157.5 g of butadiene were added in a continuous pulse manner to the reactor over 20 minutes, with a maximum reaction temperature being controlled below 100° C. during the addition. Upon the completion of the addition of the mixed monomers, the reaction was allowed to continue for further 25 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give styrene/butadiene copolymer 9. The copolymer was found to have a molecular weight of 145,000 ($M_n$).

Example 10

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 2.10 mmol of n-BuLi was added thereto. After stirring for 5 minutes, mixed monomers consisting of 245 g of styrene and 105 g of butadiene were added in a continuous pulse manner to the reactor over 45 minutes, with a maximum reaction temperature being controlled below 100° C. during the addition. Upon the completion of the addition of the mixed monomers, the reaction was allowed to continue for further 20 minutes, and 5 ml of water was then added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a styrene/butadiene copolymer. This styrene/butadiene copolymer was one in which the styrene units were present in micro-blocks, and was found to have a molecular weight of 191,000 ($M_n$).

This polymer was combined with DCP, a flowing agent, talc powder, zinc stearate, and zinc oxide. Then the combined materials were added into an internal mixer, mixed therein below 75° C. for 10 minutes, and then pelletized through a single screw extruder below 110° C. The resulting pellets were injected below 110° C. into a mould at 180° C. to be foamed. The foamed product could be used as an external thermal-insulation material of piping.

Example 11

To a nitrogen-purged 10 L polymerization reactor were charged 3.5 liters of a mixture of cyclohexane and raffinate oil (in 9:1 mixing ratio of cyclohexane to raffinate oil), which contained tetrahydrofuran in an amount of 200 mg/kg. The mixture was heated to 50° C., and 3.4 mmol of n-BuLi was added thereto. After stirring for 5 minutes, mixed monomers consisting of 227.5 g of styrene and 122.5 g of isoprene were continuously added to the reactor over 25 minutes, with a maximum reaction temperature being controlled below 100° C. during the addition. Upon the completion of the addition of the mixed monomers, the reaction was allowed to continue for further 20 minutes, and 0.825 mmol of silicon tetrachloride as a coupling agent was then added thereto. After allowing the coupling reaction to continue for 30 minutes, 5 ml of water was added to terminate the reaction. 0.2 wt % of Antioxidant 1076 and 0.4 wt % of Antioxidant 168, based on the weight of the polymer, were added to the reaction mixture and stirred for 5 minutes. Finally, the product was added to a mixture of steam and water, whereby the solvent was evaporated, and the polymer isolated out as solids and suspended in the water. The solids were seperated, dewatered with an extruding-desiccation machine, and devolatilized in a dry box, to give a star-shaped styrene/isoprene copolymer. This star-shaped polymer was found to have a molecular weight per arm of 118,000 (Mn), an average number of arms of 3.72, and a polymer molecular weight of 438,900 (Mn). This polymer could be foamed in a mould at 185° C. in a compression moulding manner. The foamed product could be used as a vehicle interior decorative material.

The patents, patent applications and testing methods cited in the specification are incorporated herein by reference.

While the invention has been described with reference to exemplary embodiments, it will be understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the appended claims.

What is claimed is:

1. A method for preparing a copolymer having micro-blocks of polystyrenic monomer and micro-blocks of polydiolefin monomer, comprising:
   1) adding at least one solvent and at least one activator to a polymerization reactor, and heating the contents to a temperature ranging from 50 to 110° C.;
   2) adding at least one initiator to the reactor, and allowing the reaction to continue for a period of time ranging from 0 to 30 minutes;
   3) preparing a mixture comprising a styrenic monomer and a first amount of a diolefin monomer, and adding the mixture to the reactor over a period of time ranging from 5 to 180 minutes continuously, wherein the rate at which the monomers are consumed in the polymerization is comparable to or greater than the rate at which the mixture is added, and further wherein the reaction temperature during the addition differs from the initiating temperature by no more than 50° C.;
   4) optionally adding a second amount of the diolefin monomer to the reactor, and allowing the reaction to continue for a period of time ranging from 5 to 30 minutes;
   5) adding at least one coupling agent to the reactor, and allowing the reaction to continue for a period of time ranging from 5 to 60 minutes; and
   6) recovering the copolymer,
   wherein no microstructure modifier is used in the method and in the resulting copolymer, at least 50 mol % of polymerized styrenic monomers and at least 50 mol % of polymerized diolefin monomers are present in molecule chains of the copolymer as micro-blocks.

2. A method for preparing a copolymer having micro-blocks of polystyrenic monomer and micro-blocks of polydiolefin monomer, comprising:
1) adding at least one solvent and at least one activator to a polymerization reactor, and heating the contents to a temperature ranging from 50 to 110° C.;
2) adding at least one initiator to the reactor, and allowing the reaction to continue for a period of time ranging from 0 to 30 minutes;
3) preparing a mixture comprising a styrenic monomer and a diolefin monomer, and adding the mixture to the reactor over a period of time ranging from 5 to 180 minutes continuously, wherein the rate at which the monomers are consumed in the polymerization is comparable to or greater than the rate at which the mixture is added, and wherein the reaction temperature during the addition differs from the initiating temperature by no more than 50° C.;
4) optionally adding an additional amount of styrenic monomer to the reactor and allowing the reaction to continue for a period of time ranging from 2 to 30 minutes; and
5) recovering the copolymer,
wherein no microstructure modifier is used in the method and in the resulting copolymer, at least 50 mol % of polymerized styrenic monomers and at least 50 mol % of polymerized diolefin monomers are present in molecule chains of the copolymer as micro-blocks.

3. The method of claim 2, wherein the at least one solvent is selected from the group consisting of cyclohexane, n-hexane, hexanes, benzene, toluene, and xylenes.

4. The method of claim 2, wherein the at least one initiator is chosen from alkyllithiums.

5. The method of claim 2, wherein the at least one activator is tetrahydrofuran and is present in an amount ranging from 50 to 1200 mg activator/kg polymerization solvent in the step (1).

6. A method for producing a foamed article, comprising blending the copolymer prepared according to claim 2 with a processing aid, a crosslinking agent and a flowing agent, and optionally with processing scraps of said copolymer, an ethylene-vinyl acetate copolymer (EVA) and processing scraps of EVA, at a temperature below 110° C.; pelletizing the resultant blend at a temperature below 110° C.; and then injecting the resultant pellets via an injection molding machine into a mold and allowing it to form a foamed article.

7. The method of claim 6, comprising blending: 100 parts by weight of said copolymer, 0 to 50 parts by weight of processing scraps of said copolymer, 0 to 60 parts by weight of the ethylene-vinyl acetate copolymer (EVA) and processing scraps thereof, 0.05 to 10 parts by weight of the flowing agent, 0.05 to 1 part by weight of the crosslinking agent, 0 to 100 parts by weight of a filler, and 0 to 5 parts by weight of a releasing agent.

8. A foamed article obtained by the method of claim 6.

9. The method according to claim 1, wherein the first amount of the diolefin monomer is about 90 to 100 wt % of the total amount of the diolefin monomer used for preparing the copolymer.

10. The method of claim 1, wherein the at least one solvent is selected from the group consisting of cyclohexane, n-hexane, hexanes, benzene, toluene, and xylenes.

11. The method of claim 1, wherein the at least one initiator is chosen from alkyllithiums.

12. The method of claim 1, wherein the at least one activator is tetrahydrofuran and is present in an amount ranging from 50 to 1200 mg activator/kg polymerization solvent in the step (1).

13. A method for producing a foamed article, comprising blending the copolymer prepared according to claim 1 with a processing aid, a crosslinking agent and a flowing agent, and optionally with processing scraps of said at a temperature below 110° C.; pelletizing the resultant blend at a temperature below 110° C.; and then injecting the resultant pellets via an injection molding machine into a mold and allowing it to form a foamed article.

14. The method of claim 13, comprising blending:
100 parts by weight of said copolymer, 0 to 50 parts by weight of processing scraps of said copolymer, 0 to 60 parts by weight of the ethylene-vinyl acetate copolymer (EVA) and processing scraps thereof, 0.05 to 10 parts by weight of the flowing agent, 0.05 to 1 part by weight of the crosslinking agent, 0 to 100 parts by weight of a filler, and 0 to 5 parts by weight of a releasing agent.

15. A foamed article obtained by the method of claim 14.

* * * * *

UNITED STATES PATENT AND TRADEMARK OFFICE
CERTIFICATE OF CORRECTION

PATENT NO. : 10,240,019 B2
APPLICATION NO. : 14/157479
DATED : March 26, 2019
INVENTOR(S) : Hongwen Liang et al.

Page 1 of 1

It is certified that error appears in the above-identified patent and that said Letters Patent is hereby corrected as shown below:

On the Title Page

Column 1, item (30), Foreign Application Priority Data, "2008 1 0132355" should read
--2008 1 0132355.0--.

Signed and Sealed this
Fourth Day of June, 2019

Andrei Iancu
*Director of the United States Patent and Trademark Office*